(12) United States Patent
Turbin et al.

(10) Patent No.: US 9,111,094 B2
(45) Date of Patent: Aug. 18, 2015

(54) MALWARE DETECTION

(75) Inventors: Pavel Turbin, Jokela (FI); Jari Lehtonen, Helsinki (FI); Mika Ståhlberg, Espoo (FI); Kai Nyman, Espoo (FI); Andrew Patel, Helsinki (FI)

(73) Assignee: F-Secure Corporation, Helsinki (FI)

( * ) Notice: Subject to any disclaimer, the term of this patent is extended or adjusted under 35 U.S.C. 154(b) by 20 days.

(21) Appl. No.: 12/931,000

(22) Filed: Jan. 21, 2011

(65) Prior Publication Data

US 2012/0192273 A1 Jul. 26, 2012

(51) Int. Cl.
*G06F 21/00* (2013.01)
*G06F 21/56* (2013.01)

(52) U.S. Cl.
CPC ..................... *G06F 21/56* (2013.01)

(58) Field of Classification Search
CPC ..... G06F 21/56; G06F 21/561; G06F 21/562; G06F 21/564; G06F 21/566; H04L 9/002; H04L 63/1441
USPC .................................................. 726/23, 24
See application file for complete search history.

(56) References Cited

U.S. PATENT DOCUMENTS

| | | | |
|---|---|---|---|
| 5,473,769 A | 12/1995 | Cozza | |
| 7,065,789 B1 | 6/2006 | Neyman et al. | |
| 7,694,150 B1 | 4/2010 | Kirby | |
| 7,962,959 B1 * | 6/2011 | Batenin | 726/24 |
| 2006/0218637 A1 | 9/2006 | Thomas et al. | |
| 2008/0313733 A1 * | 12/2008 | Kramer et al. | 726/22 |
| 2009/0133125 A1 * | 5/2009 | Choi et al. | 726/24 |
| 2010/0132038 A1 * | 5/2010 | Zaitsev | 726/22 |
| 2010/0192222 A1 * | 7/2010 | Stokes et al. | 726/22 |
| 2011/0010697 A1 * | 1/2011 | Golovkin | 717/155 |
| 2011/0083180 A1 * | 4/2011 | Mashevsky et al. | 726/23 |
| 2011/0162070 A1 * | 6/2011 | Krasser et al. | 726/23 |
| 2011/0167275 A1 * | 7/2011 | Niemel | 713/188 |
| 2011/0219450 A1 * | 9/2011 | McDougal et al. | 726/23 |
| 2011/0219451 A1 * | 9/2011 | McDougal et al. | 726/23 |
| 2012/0084859 A1 * | 4/2012 | Radinsky et al. | 726/23 |
| 2012/0117650 A1 * | 5/2012 | Nachenberg | 726/24 |
| 2012/0260343 A1 * | 10/2012 | Sun et al. | 726/24 |

FOREIGN PATENT DOCUMENTS

GB    2463467 A    3/2010

* cited by examiner

*Primary Examiner* — Justin T Darrow
*Assistant Examiner* — Hee Song
(74) *Attorney, Agent, or Firm* — Harrington & Smith (57) ABSTRACT

First data relating to a selected file is obtained. Based upon the first data it is determined if malware detection processing can be selected. Malware detection processing of the file is selected based upon said first data if it is determined that malware detection processing can be selected based upon the first data. If it is determined that, based upon the first data, malware detection processing cannot be selected based upon the first data, second data relating to the selected file is obtained and malware detection processing of the file is selected based upon said first and second obtained data. The selected malware detection processing is applied to said selected file. In an exemplary embodiment the first data is metadata and represents a faster scan of the file, and the second data is content of the file's header and represents a more in-depth scan of the file.

9 Claims, 4 Drawing Sheets

MALWARE DETECTION

TECHNICAL FIELD

The present invention relates to the detection of malware and particularly, but not exclusively, to detection of malware in which different methods can be selectively used to detect malware in the processing of particular files.

BACKGROUND OF THE INVENTION

The term "malware" is short for malicious software and is used as a term to refer to any software designed to infiltrate or damage a computer system without the owner's informed consent. Malware can include viruses, worms, trojan horses, rootkits, adware, spyware and any other malicious and unwanted software. Any computer device, such as a desktop personal computer (PC), laptop, personal data assistant (PDA) or mobile phone, can be at risk from malware.

When a device is infected by malware the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware.

Computer devices make use of anti-virus software to detect and possibly remove malware. This anti-virus software can make use of various methods to detect malware including scanning data on the computer. Malware scanning generally involves examining files for a virus fingerprint or "signature" that is characteristic of an individual malware program.

The speed at which new malware is created and distributed is increasing. As such, it is desirable that malware scanning software is able to identify an increasing number of different malware, while not making excessive demands on CPU consumption. Additionally, the increasing number of different malware increases the size of malware databases. For example, on one estimate there were about 40 million unique malware at the end of 2010. If each malware signature has a size of just 50 bytes, the total disc space required to store the resulting malware signature database is 200 MB. Given that the growth in number of malware is presently about exponential, one would expect the size of the database to double every year.

It has been proposed that so-called 'white-lists' of files known not to include malware can be created and used to optimise the malware scanning process. While, in some cases, the use of 'white-lists' improves performance, their use requires additional data storage thus worsening the data storage problems described above.

Indeed, while various techniques have been proposed to improve malware scanning efficiency, there is a need for a method which can be used to effectively determine which technique can be most effectively used to scan a particular file.

SUMMARY

It is an object of the invention to provide further improvements in malware scanning.

According to a first aspect of the present invention, there is provided a computer-implemented method of processing a plurality of files to determine whether each of said files comprises malware. The method is implemented in a computer comprising a memory storing the plurality of files and a processor. The method comprises selecting a file for processing and obtaining first data relating to said selected file. It is determined whether, based upon the first data, malware detection processing can be selected. Malware detection processing to be applied to said selected file is selected based upon said first data if it is determined that malware detection processing can be selected based upon the first data. If it is determined that, based upon the first data, malware detection processing cannot be selected, second data relating to the selected file is obtained and malware detection processing to be applied to said selected file is selected based upon said first and second obtained data. The selected malware detection processing is applied to said selected file.

Thus, where first data is sufficient to allow malware detection processing for a particular file to be selected, malware detection processing is selected based upon the first data. However, where the first data is not sufficient to allow malware detection processing to be effectively selected, second data is obtained, and malware detection processing is selected based upon the combination of the first and second data.

Each of the first and second data may comprise one or more data components. As such a determination may be made as to whether processing can be selected based upon a plurality of first data components, and if not, one or more second data components may be obtained. It will be appreciated that if the second data is insufficient to allow malware detection processing to be selected, third data relating to the selected file may be obtained to allow selection based upon the combination of the first, second and third data, and so on.

Obtaining the first data may take a first time, and obtaining the second data may take a second longer time. In this way, it is determined whether data which can be relatively quickly obtained is sufficient to allow selection of malware detection processing, with data taking a longer time to obtain being obtained only if required. For example, the first data may be obtained without reading the selected file. The first data may comprise metadata associated with the selected file or may alternatively be based upon parameters of the computer or malware scanning operation. The second data may comprise data read from the selected file, for example data read from a header of the second file.

Before obtaining said first data, the method may further comprise accessing stored data and determining whether said stored data comprises data indicating malware detection processing to be applied to said selected file. The stored data may take the form of a cache, and data identifying the selected file may be used as a basis for a lookup operation in the cache. If it is determined that the stored data comprises data indicating malware detection processing to be applied to the selected file, the indicated malware detection processing may be applied to the selected file. The first data may be obtained if but only if it is determined that the stored data does not comprise data indicating malware detection processing to be applied to said selected file.

Selecting malware detection processing to be applied to the selected file may comprise selecting one or more of a predetermined plurality of malware detection processing methods. For example, a plurality of scanning engines may be provided locally, and various remote malware detection processing methods may also be provided. The selection of malware detection processing can then take the form of selection of one or more of the locally provided scanning engines and/or selection of one or more of the remote malware detection processing methods. Selecting malware detection processing to be applied to the selected file may additionally or alternatively comprise selecting parameters associated with particular malware detection processing.

Selecting malware detection processing to be applied to the selected file may comprise selecting a plurality of malware detection processes to be sequentially applied to the selected file. For example, the selection may comprise a first malware detection process to be applied to the selected file and a second malware detection process to be applied to the selected file if the first malware detection process generates a predetermined output. The predetermined output may be based upon the presence or absence of malware as determined by the first malware detection process.

Selecting malware detection processing to be applied to the selected file may comprise selecting a plurality of malware detection processes to be concurrently applied to said file. For example the selection may comprise a first malware detection process and a second malware detection process, and the output of the malware detection processing may be based upon one of said first and second malware detection processes which first provides an output. That is, two malware detection processes may be run in parallel, and the first process to terminate may provide the output.

Selecting malware detection processing may comprise determining whether to perform malware detection processing.

The term 'memory' as used herein is intended to cover both volatile (e.g. RAM) and non-volatile (e.g. disk) memory.

Aspects of the invention can be implemented in any convenient form. For example computer programs may be provided to carry out the methods described herein. Such computer programs may be carried on appropriate computer readable media which term includes appropriate non-transient tangible storage devices (e.g. discs). Aspects of the invention can also be implemented by way of appropriately programmed computers and other apparatus.

BRIEF DESCRIPTION OF THE DRAWINGS

Embodiments of the present invention will now be described, by way of example only, with reference to the accompanying drawings, in which.

DETAILED DESCRIPTION

Figure 1:
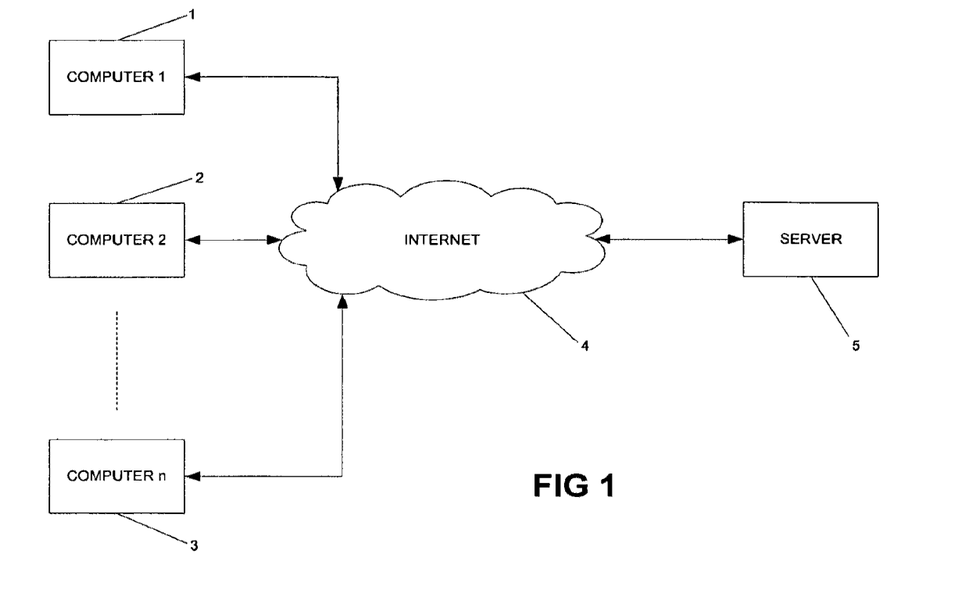
FIG. 1 is a schematic illustration of a network of computers suitable for carrying out the invention.

Referring first to FIG. 1, a plurality of computers 1, 2, 3 each are provided with malware detection software to detect files stored on the computer that are affected by malware. The computers 1, 2, 3 are each arranged to communicate with the Internet 4 and can communicate with other ones of computers 1, 2, 3 as well as with further computers via the Internet 4. Communication between computers using the Internet allows malware to be passed between computers and as such data stored on a computer is generally processed using the malware detection software periodically to identify either new files that are affected by malware or to identify files that have been affected since previously scanning the data stored on the computer using the malware detection software. A server 5 is arranged to communicate with each of the computers 1, 2, 3 and provides back-end malware detection software.

The back-end malware detection software may provide various functionality. For example, the back-end malware detection software may provide access to a centralised database of malware signatures. Similarly, the back-end malware detection software may provide access to a so-called 'white list' of data identifying files known not to contain malware, so as to make the processing of such files more efficient. Malware signatures and/or the whitelist may be periodically communicated to the malware detection software running on each of the computers 1, 2, 3 and in this way the malware detection software running on each of the computers 1, 2, 3 may be periodically updated so as to be able to detect newly identified malware or to more efficiently process files known not to contain malware.

In some embodiments, the back-end malware detection software may be arranged to receive a request from malware detection software running on one of the computers 1, 2, 3 to perform particular malware detection processing. For example, the malware detection software running on the computers 1, 2, 3 may be configured to transmit certain files to the back-end malware detection software for malware detection processing, instead of processing such files locally at one of the computers 1, 2, 3. Similarly, the malware detection software running on the computers 1, 2, 3 may be configured to transmit data identifying particular files stored on the computers 1, 2, 3 and the back-end malware detection software may be configured to receive the transmitted data and process that transmitted data with reference to a stored whitelist to determine whether the identified file is known not to contain malware.

The back-end malware detection software may be further configured to receive a request for particular code (e.g. a script) which is then downloaded to one of the computers 1, 2, 3 so as to allow files stored on one of the computers 1, 2, 3 to be scanned for malware using the particular code.

Figure 1A:
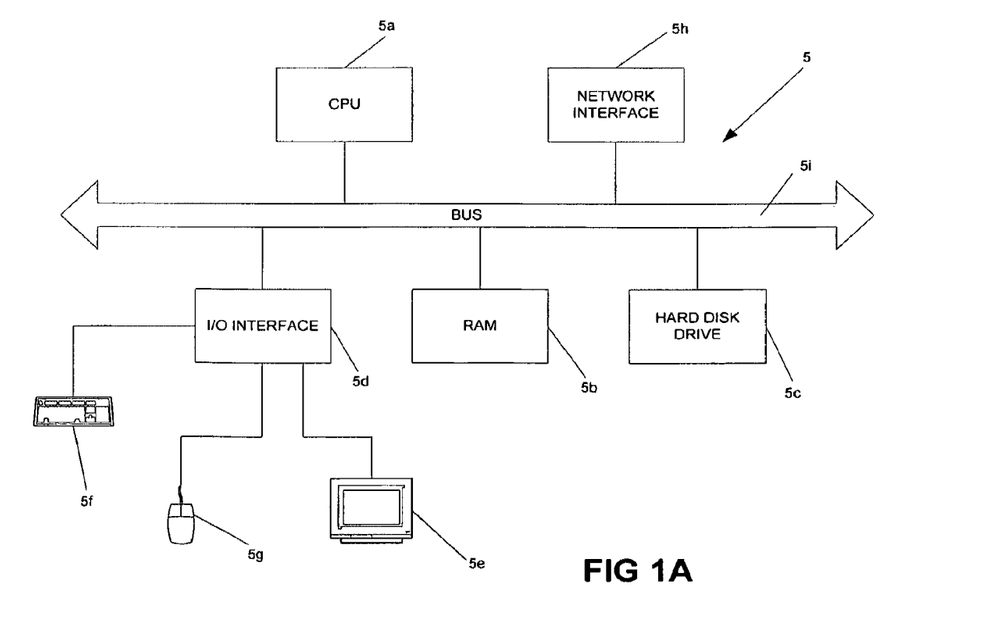
FIG. 1A is a schematic illustration of a server of FIG. 1.

FIG. 1A shows the server 5 of the system of FIG. 1 in further detail. It will be appreciated that each of the computers 1, 2, 3 has the general architecture shown in FIG. 1A. It can be seen that the server 5 comprises a CPU 5a which is configured to read and execute instructions stored in a volatile memory 5b which takes the form of a random access memory. The volatile memory 5b stores instructions for execution by the CPU 5a and data used by those instructions. For example, in use, the back-end malware detection software may be stored in the volatile memory 5b.

The server 5 further comprises non-volatile storage in the form of a hard disk drive 5c. Malware signatures and the so-called 'white list' may be stored on the hard disc drive 5c. The server 5 further comprises an I/O interface 5d to which are connected peripheral devices used in connection with the server 5. The server 5 has a display 5e configured so as to display output from the server. Input devices are also connected to the I/O interface 5d. Such input devices include a keyboard 5f, and a mouse 5g which allow user interaction with the server. A network interface 5h allows the server 5 to be connected to an appropriate computer network so as to receive and transmit data from and to other computing devices such as the computers 1, 2, 3 of FIG. 1. The CPU 5a, volatile memory 5b, hard disc drive 5c, I/O interface 5d, and network interface 5h, are connected together by a bus 5i.

Figure 2:
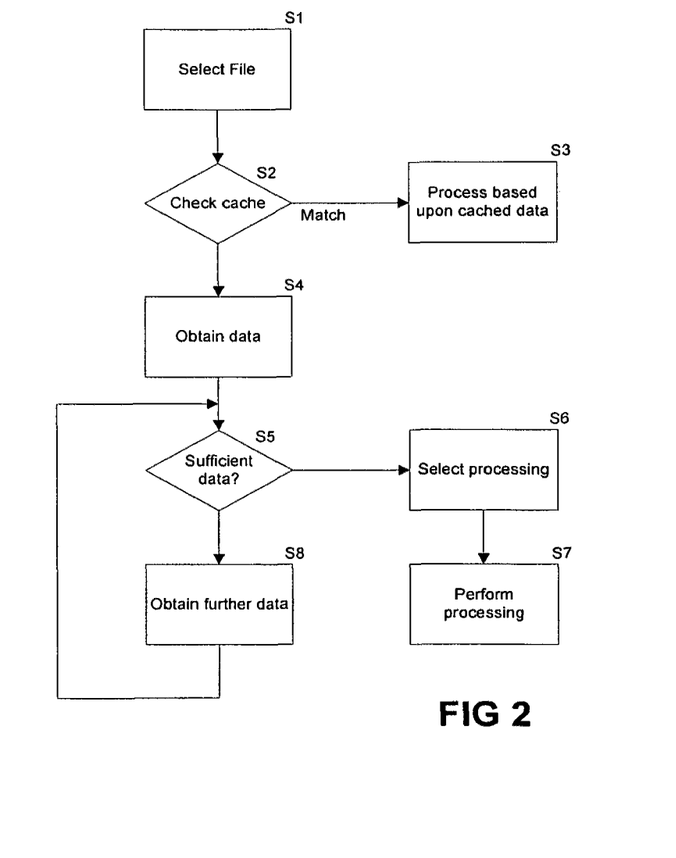
FIG. 2 is a flowchart showing processing carried out in an embodiment of the invention.

FIG. 2 is a flowchart showing processing carried out at each of the computers 1, 2, 3 to process a file to determine whether the processed file comprises malware. In the following description reference is made to the computer 1, although it will be appreciated that processing carried out by the computers 2, 3 is analogous.

At step S1 a file is selected for processing. At step S2 a check is made to determine whether a cache stored by the computer 1 comprises data associated with the selected file and indicating how the selected file should be processed to determine whether the selected file comprises malware. If it is determine that the cache stores data associated with the selected file, processing passes to step S3 where the selected file is processed based upon data obtained from the cache. For example, the check of step S2 may be carried out with reference to a path of the selected file specified by a file system running on the computer 1. In the event that the cache stores data associated with the path of the selected file a further check may be made with reference to an event log stored by the computer 1 to determine whether any changes have been made to the file stored at the determined path since the cache data was stored. If no such changes have been made, the cached data is used to determine how the selected file should be processed. In alternative embodiments the check of step S2 may be based upon sectors of a disk occupied by the selected file, the cache storing data with reference to particular sectors of the disk.

If it is determined at step S2 that the cache does not store data associated with the selected file, processing passes from step S2 to step S4. Here data relating to the selected file is obtained, and at step S5 a check is made to determine whether the data obtained at step S4 is sufficient to allow a decision to be made as to how the selected file should be processed for the purposes of malware detection. If the check of step S5 indicates that the obtained data is sufficient to allow a decision to be made, processing passes to step S6 where processing to be carried out is selected based upon the obtained data, and the selected processing is then applied to the selected file at step S7.

If it is determined at step S5 that the data obtained relating to the file is insufficient to allow a decision as to the processing to be applied to be made, processing passes to step S8 where further data is obtained, before processing returns to step S5. In this way, steps S4, S5 and S8 represent a loop in which various data relating to the file is successively obtained, and after each piece of data is obtained a check is made to determine whether sufficient data is available to reliably determine how to process the selected file for the purposes of malware detection.

The data obtained at steps S4 and S8 can take various forms. In the successive obtaining of data, data which is computationally relatively less expensive to obtain is obtained before data which is computationally relatively more expensive to obtain. Data relating to the selected file may either be obtained by reading metadata associated with the selected file, or by reading the contents of the selected file. Data obtained by reading metadata associated with the selected file is obtained before data obtained by reading the contents of the selected file on the basis that accessing metadata is, usually, relatively computationally efficient.

Data obtained from the metadata associated with the selected file may comprise data indicating the path at which the selected file is stored or one or more timestamps associated with the selected file indicating, for example, when the selected file was last created or modified. Data obtained from metadata associated with the selected file may also comprise data indicating a size of the selected file, its filename or its extension. Additionally, the metadata associated with the selected file may comprise permissions data, or data indicating a source of the file, either in terms of an address (e.g. URL) from which the file was downloaded or in terms of a process which created the file.

Data obtained by reading the contents of the selected file can often be effectively obtained from a header of the file, and can comprise data such as file type data. Additionally, data may be read from the file indicating one or more digital signatures associated with the file which may be useful in determining whether the origin of the selected file is 'trusted', such that a malware scan is not necessary.

The decision at step S5 as to whether sufficient data has been obtained to select malware detection processing (and indeed the selection of malware detection processing at step S6) is additionally based upon data relating to the nature of a malware scan being carried out and characteristics of the computer 1.

In more detail, the processing of steps S5 and S6 may be based upon the nature of the malware detection scan in that it may relate to whether the scan is a scan performed on access to a file or on demand. Data relating to a scan performed on access to a file may be further based upon whether the scan is being performed in response to application launch or a disk read or disk write operation. Data relating to the scan may also be based upon whether the scan is being applied to a single file or to a batch of files and to a security level set within the malware detection software.

The data used at steps S5 and S6 relating to characteristics of the computer 1 may be based upon network parameters associated with the computer 1 including quality of service parameters and bandwidth charges associated with network usage. Additionally parameters based upon current CPU and/or memory usage or other indicators of general system load may be used. Characteristics associated with the identity of the currently logged in user may also be used.

Figure 3:
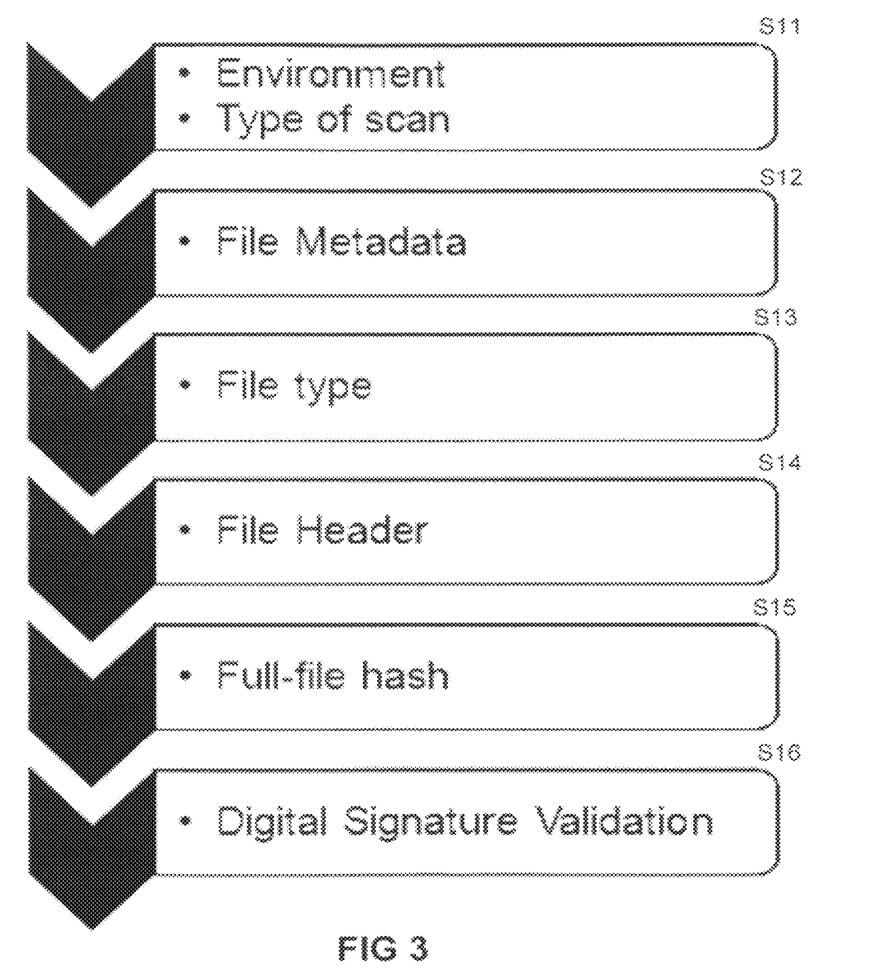
FIG. 3 is a schematic illustration showing an order in which data is obtained and processed in the processing of FIG. 2.

FIG. 3 is a schematic illustration showing an order in which various pieces of data are obtained at steps S4 and S8. First, at step S11, data relating to the computer 1 and type of scan is obtained. If the data obtained at step S11 is insufficient to allow malware detection processing to be selected, at step S12, the metadata of the selected file is read. If the data obtained at steps S11 and S12 is together insufficient to allow malware detection processing to be selected, at step S13 data associated with a file type of the selected file is obtained. Subsequently, the file header is read at step S14 a hash of the full file is obtained at step S15 while digital signature validation data is obtained at step S16, with data being acquired at each step if but only if the previously obtained data is insufficient to allow selection of malware detection processing.

The most computationally easily obtained data of that shown in FIG. 3 is that relating to the computer 1 and the type of scan being performed, as is obtained at step S11, while the data which is most computationally expensive data to obtain is that obtained at step S16. Similarly, the computational complexity of obtaining data at each step of FIG. 3 is greater than the complexity of obtaining data at each preceding step. Such computational complexity may take the form of a number of CPU cycles taken to obtain and/or process the data, or be based upon a quantity of data which need be read from a disk. As described above, data associated with a particular one of steps S12 to S16 is obtained only if data associated with preceding steps is insufficient to allow malware detection processing to be selected. As such, data which is computationally expensive to obtain is obtained only if required to select malware detection processing.

Figure 4:
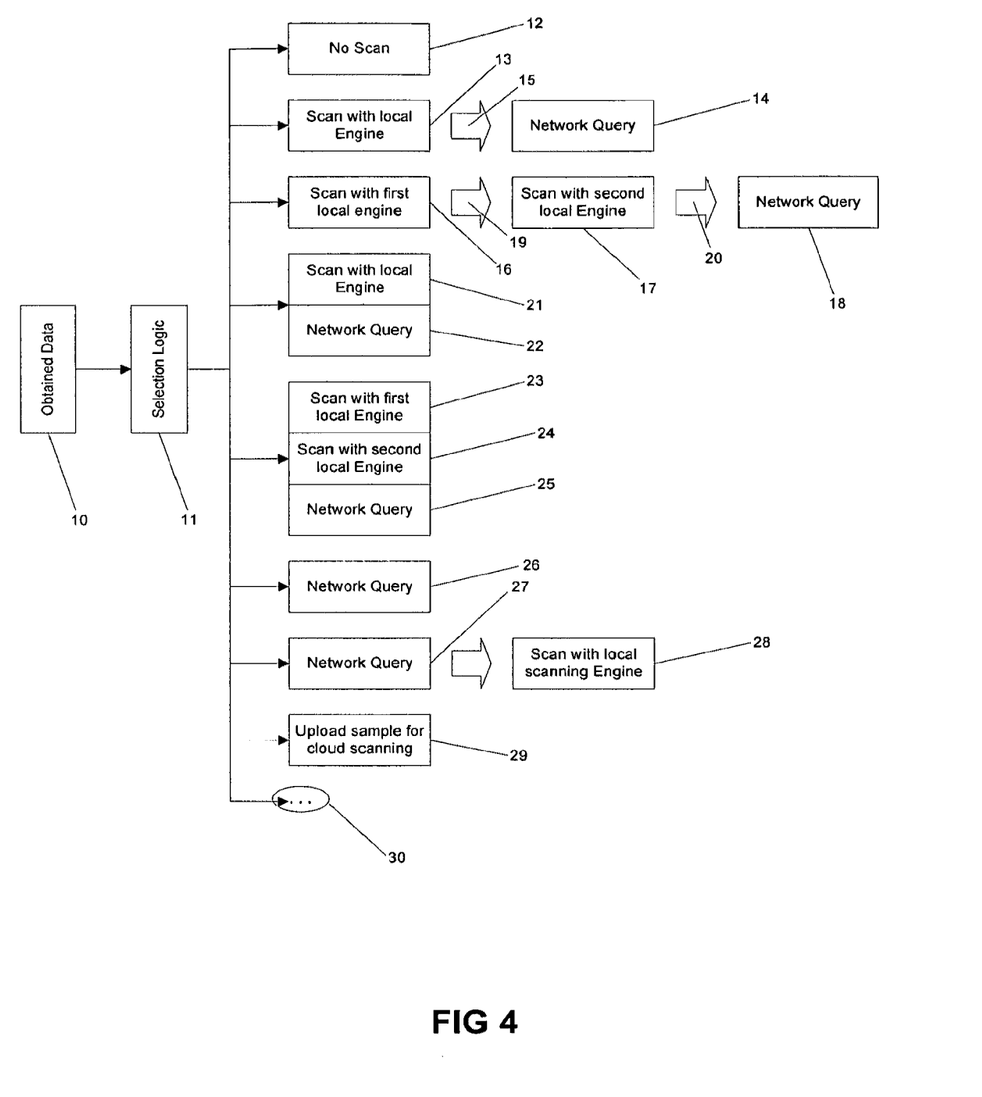
FIG. 4 is a schematic illustration of various malware detection processing.

FIG. 4 is a schematic illustration showing how obtained data 10 is processed by selection logic 11 at step S6 of FIG. 2 to select malware detection processing. In particular, FIG. 4 shows possible processing selections made by the selection logic 11.

In more detail, it can be seen that the selection logic 11 may determine, based upon the obtained data 10, that no scan is required as indicated by a block 12. Alternatively, the selection logic 11 may determine that the selected file should first be scanned locally using a particular scanning engine as indicated by block 13, and that subsequently data associated with the file should be transmitted to the server 5 for processing by the back-end malware detection software indicated by block 14. The interrelationship between the scan of block 13 and transmission to the server of block 14, indicated by an arrow 15, may vary depending upon the nature of the local scanning and the nature of the processing by the server. For example, it may be that if the scan of block 13 indicates that no malware is found, this is sufficient to prevent further processing. Alternatively, it may be that the file is always transmitted over the network as indicated by block 14 so as to allow further malware detection processing to be carried out.

The selection logic 11 may determine that a particular file should be scanned by a first local scanning engine as denoted by a block 16, then scanned by a second local scanning engine as denoted by a block 17, before being transmitted over a network for processing by a server as denoted by a block 18. The first and second local scanning engines can take various forms, however the first and second scanning engines process the file in different ways to determine whether malware is present. Again, the relationship between the scans with the first and second local engines (denoted by the blocks 16, 17) and the transmission to the server (denoted by the block 18) are represented by arrows 19 and 20, and can be such that subsequent processing is carried out only if preceding processing provides a particular outcome, or such that subsequent processing is carried out independently of the outcome of preceding processing.

The selection logic 11 may determine that a particular file should be processed in two different ways in parallel, for example the selection logic may determine that a particular file should be scanned by a local scanning engine, as denoted by a block 21, and transmitted over a network for remote processing at a server, as denoted by a block 22 in parallel. In such a case the selection logic 11 may determine either that a decision as to whether a file contains malware should be based upon the outcome of both the local and remote processing, or may alternatively determine that if one of the local and remote processing indicate that the file does not contain malware, the other of the local and remote processing can end.

Similarly, the selection logic may determine that a particular file should be scanned by first and second local scanning engines in parallel, as denoted by blocks 23, 24 and also transmitted over a network for scanning at a server as indicated by a block 25. Again, the selection logic may determine either that all processing denoted by blocks 23, 24, 25 must complete or may determine that an indication from the processing of one of the blocks that no malware is present is sufficient to declare that the file does not contain malware.

In some cases, the selection logic 11 may determine that the only processing to be carried out is a query over the network based upon data relating to the particular file, as indicated by a block 26.

In some cases, the selection logic 11 may determine that, first, a query should be carried out over the network based upon data relating to the particular file, as indicated by the block 27, and that subsequently local scanning with a particular scanning engine should be carried out as indicated by a block 28.

In some cases, the selection logic 11 may determine that the file should be uploaded to a remote server over the network for scanning, as indicated by a block 29.

It will be appreciated that the processing illustrated in FIG. 4 is exemplary. Indeed, as indicated by ellipses 30, other processing may be selected by the selection logic 11. Whilst various processing has been described with reference to FIG. 4 as being carried out sequentially or in parallel it will be appreciated that various parts of the described processing can be combined in any convenient way.

Each of the local scanning engines referred to above can take any suitable form. For example one local scanning engine may be based upon virus pattern recognition methods, another may use a whitelist of known clean files and another may search for virus signatures. The selection logic 11, in addition to selecting a local scanning engine to be used for a particular file may also determine settings which the local scanning engine is to use during scanning.

Where reference is made in the description of FIG. 4 to performing a query over a network, such a query can take a variety of different forms. For example, a lookup of a hash generated from a particular file may be carried out or a comparison of some signature from the particular file may be carried out. Alternatively, the query performed over the network may take the form of a request for a script to be applied to the file during malware scanning.

Examples of processing which may be selected by the selection logic 11 for various files is now described.

Where the selection logic encounters a file of MS Word which was created by a process "WinWord.exe", it may be determined that no scanning is required. Similarly, a file of type MS Word created by FireFox.exe but downloaded from the URL "mircrosoft.com" may not require scanning. Files which are executable, but authenticate signed with a certificate from a trusted source also may not need scanning.

Where a file is small, for example an executable installed in a user's home directory, the scanning logic may determine that it should be scanned locally with a first scanning engine and that a query based upon the file should be performed across the network in parallel. In the event that neither the local scan or network query detect malware, then a further scan with a second local engine may be carried out.

Where a file is a large archive file stored in the directory "c:/windows", as a first step a query may be performed across the network based upon data obtained from the file on the basis that it is likely that this file is clean and is included in a white list stored at the server. In the event that the network query fails to confirm that the file is clean, the file may subsequently be scanned with one or more local scanning engines.

Where a scan is carried out on a file stored on CD-ROM, the selection logic may decide that, as a first step, a network query should be carried out in order to avoid needing to read the entire file from the CD-ROM, and thereby avoiding slow file I/O operations.

Where an installer file is stored on a mobile device and is being written to disk, and network bandwidth is limited, the file may initially be scanned locally, and a network query may be carried out only if the program is launched.

Where an attempt is made to access a file, but network connectivity is unavailable, all local engines may be selected by selection logic 11, and a user may be warned that network scanning has not been possible due to the lack of network connectivity.

Where a scan is to be carried out, but CPU load is high, the selection logic may select a network query in preference to local scanning, so as to avoid further load on the CPU. However, in such a case scanning by local engines may be carried out with low priority.

In some cases, the selection logic may be aware that only a particular one, or a particular subset, of the locally provided scanning engines is suitable for scanning a particular file type. In such a case, the selection logic will select only the one or more appropriate engines to scan the selected file for malware. Additionally, where an image file is to be scanned, the selection logic may not transmit a hash of the image file over the network on the basis that many image files are unique to an individual user, and are therefore unlikely to be known to the backend malware detection software.

It will be appreciated that various other selections may be made depending on particular parameters associated with a file to be scanned, network connectivity, and CPU load.

It was described above, with reference to step S2 of FIG. 2 that a check is carried out to determine whether a file selected from processing has previously been processed such that cache data indicates how that selected file should be processed. When a particular processing method is selected at step S6 of FIG. 2, the cache data can be updated based upon the selected processing. Data stored in the cache may have a time for which it is valid, for example until the selected file is modified, until the computer is rebooted, or for a particular period of time e.g. 24 hours.

Referring again to FIG. 2, although steps S5 and S6 are shown as separate steps, it will be appreciated that in some implementations the processing of steps S5 and S6 is combined such that an attempt is made to select malware detection processing based upon the available data, and if successful the selected malware detection processing is applied, while if unsuccessful further data is obtained.

Although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data. Additionally, and as indicated above, whilst processing has been described above as being carried out for individual files in turn, various processing steps may be carried out for all files before proceeding to further processing steps.

The invention claimed is

1. A computer-implemented method of processing a plurality of files to determine whether each of said files comprises malware, where a plurality of malware detection processing methods are available, the method being implemented in a computer comprising a memory storing the plurality of files and a processor, the method comprising:
   selecting, by the processor, a file for processing;
   inspecting, by the processor, said selected file to obtain first data relating to said selected file;
   determining, by the processor, whether, based on the first data, a malware detection processing method can be selected from said plurality of malware detection processing methods and selecting a malware detection processing method to be applied to said selected file based upon said first data if it is determined that a malware detection processing can be selected based upon the first data;
   if it is determined that, based upon the first data, a malware detection processing method cannot be selected, inspecting, by the processor, said selected file to obtain second data relating to said selected file, and selecting a malware detection processing method from said plurality of malware detection processing methods to be applied to said selected file based upon a combination of said first data and said second data;
   applying said selected malware detection processing method to said selected file.

2. A method according to claim 1, wherein obtaining said first data takes a first time, and obtaining said second data takes a second longer time.

3. A method according to claim 1, wherein said first data is obtained without reading the selected file.

4. A method according to claim 1, wherein said first data comprises metadata associated with the selected file.

5. A method according to claim 1, wherein said second data comprises data read from the selected file.

6. A method according to claim 1, wherein before obtaining said first data, the method further comprises:
   accessing stored data;
   determining whether said stored data comprises data indicating a malware detection processing method to be applied to said selected file;
   if it is determined that said stored data comprises data indicating a malware detection processing method to be applied to said selected file, applying said indicated malware detection processing method to said selected file; and
   obtaining said first data if but only if it is determined that said stored data does not comprise data indicating a malware detection processing method to be applied to said selected file.

7. A method according to claim 1, wherein selecting a malware detection processing method to be applied to the selected file comprises selecting parameters associated with the particular malware detection processing method.

8. A non-transitory computer readable memory carrying computer program code comprising:
   code for selecting a file for processing;
   code for inspecting said selected file to obtain first data relating to said selected file;
   code for determining whether, based on the first data, a malware detection processing method can be selected from a plurality of available malware detection processing methods and selecting a malware detection processing method to be applied to said selected filed, based upon said first data if it is determined that a malware detection processing method can be selected based upon the first data;
   code for inspecting said selected file to obtain second data relating to said selected file, and selecting a malware detection processing method from said plurality of malware detection processing methods to be applied to said selected file based upon a combination of said first data and said second data if it is determined that, based upon the first data alone, a malware detection processing method cannot be selected; and
   code for applying said selected malware detection processing method to said selected file.

9. A computer apparatus for processing a plurality of files to determine whether each of said files comprises malware, the apparatus comprising:
   a non-transitory memory storing processor-readable instructions; and
   a processor configured to read and execute instructions stored in said memory;

wherein said processor-readable instructions comprises instructions configured to control the processor to at least:

select a file for processing;

inspect said selected file to obtain first data relating to said selected file;

determine whether, based on the first data, a malware detection processing method can be selected from a plurality of available malware detection processing methods and selecting a malware detection processing method to be applied to said selected filed based upon said first data if it is determined that a malware detection processing method can be selected based upon the first data;

if it is determined that, based upon the first data, a malware detection processing method cannot be selected, inspect said selected file to obtain second data relating to said selected file, and select a malware detection processing method from said plurality of malware detection processing methods to be applied to said selected file based upon a combination of said first data and said second data; and apply said selected malware detection processing method to said selected file.

* * * * *